(12) United States Patent
Bessac et al.

(10) Patent No.: US 9,844,913 B2
(45) Date of Patent: Dec. 19, 2017

(54) METHOD AND APPARATUS FOR PRODUCING THREE-DIMENSIONAL OBJECTS

(71) Applicants: COMPAGNIE GENERALE DES ESTABLISSEMENTS MICHELIN, Clermont-Ferrand (FR); MICHELIN RECHERCHE ET TECHNIQUE S.A., Granges-Paccot (CH)

(72) Inventors: Christophe Bessac, Clermont-Ferrand (FR); Frédéric Pialot, Clermont-Ferrand (FR); Gilles Walrand, Clermont-Ferrand (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 440 days.

(21) Appl. No.: 14/367,619

(22) PCT Filed: Dec. 21, 2012

(86) PCT No.: PCT/EP2012/076630
§ 371 (c)(1),
(2) Date: Jun. 20, 2014

(87) PCT Pub. No.: WO2013/092997
PCT Pub. Date: Jun. 27, 2013

(65) Prior Publication Data
US 2014/0348692 A1 Nov. 27, 2014

(30) Foreign Application Priority Data
Dec. 23, 2011 (FR) .................................... 11 62367

(51) Int. Cl.
*B29C 67/00* (2017.01)
*B33Y 30/00* (2015.01)
(Continued)

(52) U.S. Cl.
CPC ........ *B29C 67/0074* (2013.01); *B22F 3/1055* (2013.01); *B29C 64/141* (2017.08);
(Continued)

(58) Field of Classification Search
CPC .... B33Y 10/00; B22F 2/1055; B29C 67/0074
(Continued)

(56) References Cited

U.S. PATENT DOCUMENTS

| | | |
|---|---|---|
| 2001/0048182 A1 | 12/2001 | Caretta et al. |
| 2008/0014457 A1 | 1/2008 | Gennaro et al. |
| 2012/0237745 A1* | 9/2012 | Dierkes ............... A61K 6/0215 428/215 |

FOREIGN PATENT DOCUMENTS

| | | |
|---|---|---|
| CN | 101670432 A | 3/2010 |
| DE | 102010011059 A1 | 9/2011 |

(Continued)

OTHER PUBLICATIONS

PCT/EP2012/076630, International Search Report (ISR), Form PCT/ISA/210, dated Feb. 11, 2013 (including English translation), 7 pgs.

*Primary Examiner* — Weiping Zhu
(74) *Attorney, Agent, or Firm* — Dickinson Wright, PLLC

(57) ABSTRACT

An apparatus and a process for manufacturing a three-dimensional object by successive layer-by-layer consolidation of selected zones of a powder stratum, the consolidated zones corresponding to successive sections of the three-dimensional object, each layer being divided into a central internal portion and an external border, said process comprising the following steps in order:
  a—depositing a powder layer on a holder;
  b—fusing the external border of said powder layer by means of a laser beam originating from a first energy source by moving the laser beam of said first energy
(Continued)

source relative to the object along a preset path that follows the contour of said external border corresponding to the contour of the cross section of the object so as to selectively fuse said layer; and c—fusing the central internal portion of the powder layer by means of an electron beam originating from a second energy source, by moving the electron beam of said second energy source relative to the object so as to sweep it over said central internal portion along a preset path corresponding to the central internal portion of the cross section of the object so as to selectively fuse said layer; or d—repeating steps a and b N times so as to form a plurality of superposed layers of fused material forming a portion of the external border of said object and then carrying out step c so as to fuse the central internal portion of the object corresponding to the N powder layers; and e—repeating steps a to c or a, b and d until all the layers of the object have been consolidated.

16 Claims, 3 Drawing Sheets

(51) Int. Cl.
*B33Y 10/00* (2015.01)
*B22F 3/105* (2006.01)
*B29C 64/141* (2017.01)
*B29C 64/153* (2017.01)
*B29C 64/386* (2017.01)
*B29K 105/00* (2006.01)

(52) U.S. Cl.
CPC .......... *B29C 64/153* (2017.08); *B29C 64/386* (2017.08); *B33Y 10/00* (2014.12); *B33Y 30/00* (2014.12); *B22F 2003/1056* (2013.01); *B29K 2105/251* (2013.01); *Y02P 10/295* (2015.11)

(58) Field of Classification Search
USPC ........................................................ 264/308
See application file for complete search history.

(56) References Cited

FOREIGN PATENT DOCUMENTS

| EP | 0868955 A1 | 10/1998 |
| EP | 2156941 A1 | 2/2010 |
| EP | 2292357 A1 | 3/2011 |
| EP | 2712692 A1 | 4/2014 |

* cited by examiner

METHOD AND APPARATUS FOR PRODUCING THREE-DIMENSIONAL OBJECTS

This application is a 371 national phase entry of PCT/EP2012/076630, filed 21 Dec. 2012, which claims benefit of FR 1162367, filed 23 Dec. 2011, the entire contents of which are incorporated herein by reference for all purposes.

BACKGROUND

1. Field

The present disclosure relates to a process and an apparatus for producing three-dimensional objects by successive, layer-by-layer, consolidation of selected zones of a layer of a pulverulent material, the consolidated zones corresponding to successive sections of the three-dimensional object. Such a powder-based manufacturing process, also called additive manufacturing, involves, layer by layer, completely or partially sintering or fusing powder grains using electromagnetic radiation (for example a laser beam) or a particle beam (for example an electron beam).

2. Description of Related Art

An example of a tool able to produce a three-dimensional object layer by layer from a pulverulent material by selective fusion of a powder is known from document U.S. Pat. No. 4,863,538. Such a tool comprises a microprocessor-comprising control unit for controlling and directing the energy of a laser beam over a layer of pulverulent material deposited beforehand on a holder of the tool, in order to consolidate a portion of said layer, this operation being repeated layer by layer. The successive cross sections of the object to be obtained are loaded into the microprocessor, which controls the laser beam in order to fuse the powder particles depending on the contours of the cross sections of the object. Such a tool allows complex objects that are difficult to produce with conventional manufacturing techniques to be produced with good tolerances. However, because this tool uses a low-power laser beam, it takes a long time to manufacture an object, and thus this tool proves to be useful only when manufacturing fairly small prototypes.

U.S. Pat. No. 6,007,764 describes a solution for improving the manufacture of a three-dimensional object manufactured by selective fusion of a powder, layer by layer, using a laser beam. According to this document, the powder used to obtain the three-dimensional object, which powder is formed from opaque particles, is mixed with transparent particles, such as silica particles, which particles promote transmission of the energy of the laser beam into the powder layer. Thus, the laser beam is able to penetrate further into the powder and the last consolidated layer adheres better to those solidified beforehand. As a variant, two laser sources are used, one to preheat the powder and the other to fuse the powder particles. Although this certainly makes it possible to work more rapidly and with thicker powder layers, adding particles of a different nature to that of the base material of the object runs the risk of modifying not only the composition but also the mechanical properties of the object post-solidification.

Power sources emitting more powerful laser beams have recently been developed. However, it has been observed that the amount of energy absorbed by the powder, especially if it is a question of metal powder, is very small because a large proportion of the energy of the laser beam is reflected by the powder particles. Thus, even if a powerful laser beam is used in such a manufacturing process, its productivity remains low.

Moreover document WO 01/81031 is known, this document describing a device for manufacturing a three-dimensional object, which device comprises a holder for the object to be constructed, an element for distributing successive powder layers over said holder, and an electron gun controlled by a control unit in order to selectively fuse cross sections of the object to be produced, which cross sections are formed in succession from powder layers deposited in succession on said holder. The device moreover comprises means for detecting the temperature distribution over the surface of the powder layer, allowing the operating parameters of the electron gun to be controlled so as to prevent temperature differences from appearing in the various layers and therefore strains in the object obtained. Such electron-gun-based devices make it possible to apply a power higher than that of the laser-based devices described above, and thus they are more efficient and have a higher productivity than the laser-based devices. However, because it is difficult to focus the electron beam, and because of powder grain charging effects at the point of impact of the electron beam, it has been observed that the quality of the surface of the object obtained with an electron-gun-based device is lower than that obtained with a laser-based device.

Moreover, document WO 2004/056510 describes a process for producing three-dimensional bodies by successive, joint fusion of chosen zones of a powder bed using an electron gun. In this document, the operating principle of the electron gun is such that energy transfer takes place in a plurality of fusion zones that simultaneously propagate through the chosen zone in order to form the cross section of the three-dimensional body. Although it allows productivity to be further increased, in the same way as the device of the preceding document this process does not allow parts having a high surface quality to be obtained. Specifically, because the electrons of the beam are highly accelerated they have substantial kinetic energy when they hit the powder layer and, as a result, pulverulent material is ejected from around the point of impact of the beam. In addition, because the particles composing the electron beam are charged, the pulverulent material becomes charged at the point of impact and, thus, particles tend to shift position around said point, resulting in the consolidated layer of powder having a substantial roughness or even porosity.

Document EP 2 156 941 describes a method for manufacturing an air or oil filter by melting powder particles using a laser beam or an electron beam. This document discloses that it is preferable to use an electron beam to produce an oil filter because a higher porosity is obtained than with a laser beam, thereby making it possible to trap oil particles.

Moreover, a machine for additive manufacturing based on ceramic or glass-ceramic powder is known from document EP 2 292 357, which machine uses two laser beams, a first unfocused laser beam being used to preheat the powder, and a second focused laser beam being used to fuse the powder. Electron beams may also be used instead of laser beams. Objects having improved mechanical properties are indeed obtained, but no attention is paid to the surface finish of the objects thus produced.

Document DE 10 2010 0111059 is also known, this document describing another machine for powder-based additive manufacturing, this machine comprising two electron beams used to simultaneously fusion, layer by layer, a plurality of zones of the powder layer. Three-dimensional objects are indeed obtained with a high productivity, but again no attention is paid to the surface finish of the objects thus produced.

SUMMARY

The aim of embodiments of the invention is to reduce these drawbacks and to provide a process and an apparatus for producing three-dimensional objects by selective fusion of a powder, allowing objects having complex shapes and a good quality surface finish to be obtained with a good productivity.

Another aim of embodiments of the invention is to provide an improved process and a rapid, high-performance apparatus for producing three-dimensional objects by selective fusion of a powder, allowing objects that have the desired geometry and good mechanical properties and that do not contain strain or internal tension post-manufacture to be obtained.

These aims are achieved with a process for manufacturing a three-dimensional object by successive layer-by-layer consolidation of selected zones of a powder stratum, the consolidated zones corresponding to successive sections of the three-dimensional object, each layer being divided into a central internal portion and an external border, said process comprising the following steps in order:

a—depositing a powder layer on a holder;
b—fusing the external border of said powder layer by means of a laser beam originating from a first energy source by moving the laser beam of said first energy source relative to the object along a preset path that follows the contour of said external border corresponding to the contour of the cross section of the object so as to selectively fuse said layer; and
c—fusing the central internal portion of the powder layer by means of an electron beam originating from a second energy source, by moving the electron beam of said second energy source relative to the object so as to sweep it over said central internal portion along a preset path corresponding to the central internal portion of the cross section of the object so as to selectively fuse said layer; or
d—repeating steps a and b N times so as to form a plurality of superposed layers of fused material forming a portion of the external border of said object and then carrying out step c so as to fuse the central internal portion of the object corresponding to the N powder layers; and
e—repeating steps a to c or a, b and d until all the layers of the object have been consolidated.

More particularly, the process of embodiments of the invention uses, in combination, two different energy sources using different operating parameters, thereby allowing an object having different surface, mechanical or metallurgical properties on its periphery (or skin) and in its volume (or core) to be obtained by dedicating each source to a portion of the object to be produced, namely the skin or core respectively. Thus, the process of the invention allows the skin of the object to be consolidated using a laser-beam source, the laser beam, although it moves rather slowly, allowing a smooth surface having a good hardness to be obtained. It also allows the core of the object to be more rapidly consolidated using the electron-beam source as the electron beam is more energetic than the laser beam and moves more rapidly than the latter, the roughness obtained however being higher than with the first source. The skin and the core of the object are obtained by successive, joint consolidation of zones, some of which form the external periphery of the object, and others of which form the central internal portion of the object, these zones being defined layer by layer and corresponding to cross sections of the object (the term "sections" being understood to mean horizontal planes parallel to the worktable). Thus, this process is suitable for manufacturing three-dimensional objects having a complex geometry and, for a given section, a periphery of small size relative to that of the core.

Thus, for each powder layer, the periphery or skin of the object is consolidated, over a small thickness, using a laser beam that is moved slowly, in order to obtain a low roughness, while the time for which the laser needs to be used is decreased due to the small size of the area to be consolidated (which is reduced to an outline). A rapid consolidation of the core of the object is also obtained, preferably simultaneously, either in a layer-by-layer operation or by simultaneously solidifying a plurality of core layers, the operating parameters of the electron beam being set to increase the fusion rate. Given the energy efficiency of each source, which efficiency is very high for the electron beam (about 90%) and very low for the laser beam (about 10%), combining the two sources so that one of them produces the core of the object and the other the skin of the object allows complex objects to be obtained at a high rate.

Preferably, for a given section, the width of said external border is at most 1 mm.

Such an external border must be quite thin in order to make it possible to manufacture, in its entirety and efficiently, an object by selective fusion of powder layers using a slow source for the periphery and a rapid source for the core of the object, on account of the ratio of the speeds of the two sources. However, on account of the diameter of the electron beam and its zone of influence, the border must be thick enough to allow it to preserve its surface properties even after the electron beam has been passed along the edge of the periphery worked beforehand by the laser beam.

Advantageously, the fusion by the laser beam starts in a zone distant from the centre of the object, and the fusion by the electron beam starts in a zone near the centre of the object. This makes it possible to obtain a first consolidated peripheral portion that encloses and holds in place powder that is located in the centre and that has not yet been fused, while allowing the two beams to be kept far enough apart in order for it to be easier to move them relative to each other.

In certain variant embodiments of the invention, the process comprises an additional step of fusion by the laser beam of an internal border or of a bead arranged in the central internal portion. This allows various shapes and/or various material densities to be obtained in the core of the object.

Advantageously, the ratio between the energy delivered by the electron beam and the energy delivered by the laser beam is comprised between 4:1 and 9:1.

Thus, most of the energy of the system is applied to the core of the part. This allows a complex object to be rapidly and efficiently manufactured by selective fusion of powder layers using two sources having different powers and movement speeds, the most powerful source being applied to the core of the object.

Preferably, the particles that compose said powder have an average diameter comprised between 5 and 300 µm.

In one variant embodiment, said central internal portion has an open structure. Such an open structure may be a three-dimensional mesh, a honeycomb structure, or even a porous structure. This makes it possible to decrease the weight of the part, or to use it as a thermal brake to prevent heat transmission, etc., or even to use it as a matrix into which another product may be injected, in order to improve the properties thereof, etc.

Preferably, the process comprises at least one additional step of preheating the powder layer using at least one of said first or second energy sources. This allows thermal gradients to be decreased during manufacturing, and therefore strains in the object produced.

Advantageously, the process comprises an additional step of finishing the central internal portion and the external border of the object by fusing the last powder layer using the laser beam. This allows an object to be obtained the last layer (or top) of which has a good roughness over its entire surface and allows, for example, fatigue resistance to be improved by reducing the number of cracks in the skin, or heat transmission to be increased. Moreover, it may also be possible to obtain an improvement in the strength of the object thus produced.

Preferably, the specific power of the electron beam is comprised between 2 and $50\times10^6$ W/cm$^2$.

Preferably, the specific power of the laser beam is comprised between 200 and 2400 kW/cm$^2$.

The higher energy efficiency of the electron-beam source is mainly due to its higher power, compared to that of a laser source. In addition, the electron beam is steered by a magnetic-field-based system whereas the laser beam is steered by a system based on solid mirrors, meaning that the electron beam may be moved more rapidly.

The process of embodiments of the invention may be used with metal or ceramic powders. In a preferred variant of the invention, a metal powder is used. This makes it possible to rapidly produce metal parts that have complex shapes and a good density and that stand up well to various mechanical stresses.

Advantageously, the focal point of the electron beam is located above the surface of said powder layer. Thus the region of impact of the beam on the powder layer is large in area and small in depth, thereby enabling rapid fusion to be obtained while preventing the beam from penetrating deep into previously consolidated layers.

Preferably, said three-dimensional object is a mould or a mould portion for the manufacture of a tyre. The process of the invention allows parts having complex shapes to be formed and is more particularly recommended for manufacturing a mould or a mould portion for a tyre, such as a mould lining containing small elements such as blades or beads.

The aims of embodiments of the invention are also achieved with an apparatus for manufacturing a three-dimensional object by successive, layer-by-layer consolidation of selected zones of a powder layer, said zones corresponding to successive sections of the three-dimensional object, each layer being divided into a central internal portion and an external border, said apparatus comprising:
  means for holding said object;
  distributing means able to apply at least one powder layer to said holder or to a previously consolidated layer of said object;
  a first energy source emitting a laser beam, which source is applied so as to fuse the external border of said powder layer by moving the laser beam of said first energy source relative to the object along a preset path that follows the contour of said external border corresponding to the contour of the cross section of the object so as to selectively fuse said layer;
  a second energy source emitting an electron beam, which source is applied so as to fuse the central internal portion of said powder layer by moving the electron beam of said second energy source relative to the object so as to sweep it over said central internal portion along a preset path corresponding to the central internal portion of the cross section of the object so as to selectively fuse said layer; and
  a microprocessor-based control unit for controlling the movement of said beams depending on the geometry of said object and a movement algorithm loaded into the memory of the control unit.

Advantageously, said means and energy sources are placed inside a vacuum chamber. This makes it possible to operate two energy sources, emitting an electron and laser beam, respectively, efficiently in a common chamber while preventing both oxidation effects during the laser fusing and electron dispersion, and ensuring gases issued from operations carried out while the object is being manufactured are pumped away.

Advantageously, the apparatus of embodiments of the invention comprises means for measuring the temperature of the powder layer, which means are connected to said control unit. This allows the operating parameters of the energy sources to be more finely adjusted and matched to the object to be manufactured.

The expression "laser-beam source" is understood to mean at least one such source and the expression "electron-beam source" is understood to mean at least one such source, a plurality of sources possibly being used in combination in the process and apparatus of the invention.

BRIEF DESCRIPTION OF DRAWINGS

The embodiments of the invention will be better understood by virtue of the following description, which makes reference to the following figures.

In the various figures, identical or similar elements have been given the same reference numbers. Their description is therefore not systematically repeated. Moreover, it will be noted that the thicknesses of the various layers, the widths of the borders or beads and the dimensions of the radiation beams or of the object produced have intentionally not been shown to scale in order to make the figures legible.

Figure 1:
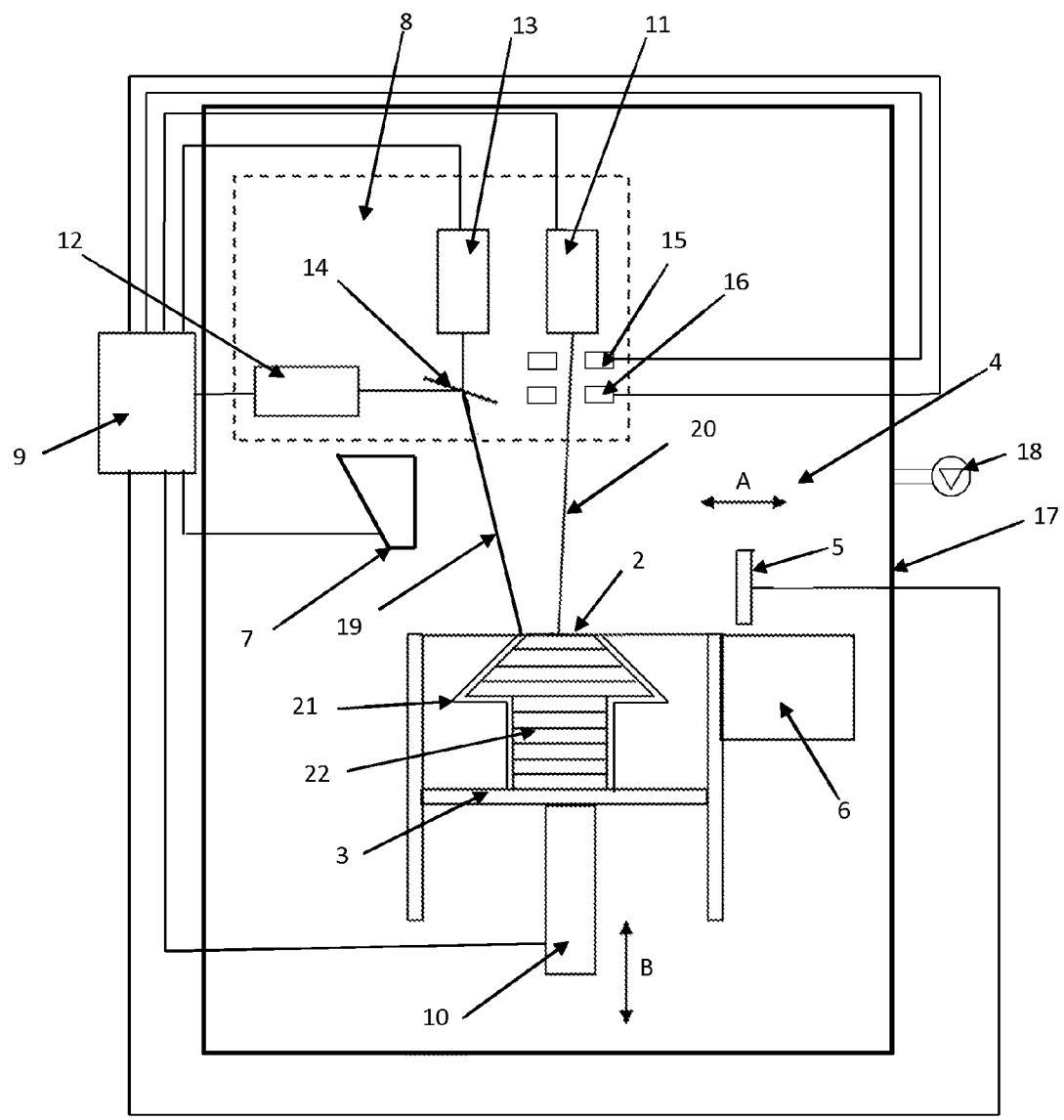
FIG. 1 is a cross-sectional view schematically showing an apparatus for manufacturing a three-dimensional object according to embodiments of the invention.

FIG. 1 illustrates an apparatus 1 for manufacturing a three-dimensional object 2. The apparatus comprises a worktable that, as illustrated, is a horizontal platen 3 on which the object 2 is constructed, and for which it forms a holder. The apparatus also comprises means 4 for distributing powder originating from a powder hopper 7 located above the platen 3, said distributing means being able to spread a thin layer of powder over the platen 3, for example using a doctor blade 5. The doctor blade 5 is caused to move by actuating means (not shown) in order to make an alternating translational movement in a horizontal plane, as indicated by the double-headed arrow A above the platen 3. Thus, the doctor blade 5 spreads the powder into a thin layer from below the output of the hopper 7, surplus powder being pushed by the doctor blade 5 into a recovery tray 6. The doctor blade 5 is preferably returned to its initial position near the outlet of the hopper 7 before a new powder-spreading cycle is started. As a variant, a device (not shown in the drawings) for compacting the spread powder layer may also be provided. Thus, the powder layer spread over the platen 3 forms a stratum that is selectively fused using one or more energy beams from a bank 8 of energy sources. The three-dimensional object 2 is produced by selectively fusing or sintering powders, and constructed by superposing layers on the basis of a computer model of the object. The energy beam (or energy beams) is (are) steered by a microprocessor of a control unit 9 comprising the model of the object, so as to manufacture the object by successive fusion or sintering of superposed powder layers. In an object manufacturing cycle, the platen 3 is regularly lowered, after consolidation of each powder layer, by a distance equal to the thickness of the consolidated powder layer. To do this, the platen 3 is connected to a mechanism for driving a vertical translational movement, indicated by the double-headed arrow B, for example by connecting the vertical support shaft 10 of the platen 3 to a rack-and-pinion or nut-and-bolt mechanism actuated by a servomotor or stepper motor.

More particularly according to an embodiment of the invention, the apparatus 1 comprises two different energy sources: an electron-beam gun 11 and a laser source 12.

The laser source 12 is for example a $CO_2$ or an Nd:YAG laser that has a power of 500 W or more. The laser source 1 is connected to a unit 13 for steering a galvanometer mirror 14, which allows the laser beam 19 issued from the source 12 to be oriented relative to the object 2 depending on information transmitted by the control unit 9. The laser beam may be moved by the control unit 9 at a speed of about 10 m/s.

The electron gun 11 comprises, as is known, a high-voltage circuit that produces the voltage for accelerating electrons emitted from the filament of the gun, which filament is for its part connected to a current source allowing it to be heated so as to emit electrons. The electron beam 20 issued from the gun is orientated, by deflecting coils 16, relative to the object 2 depending on information transmitted by the control unit 9. The apparatus 1 also comprises coils 15 for focusing the beam, allowing the electron beam to be focused relative to the worked zone of the object 2. The power of the electron gun is about 3000 W and its beam may be moved at a speed of about 1000 m/s.

The components of the apparatus 1 are arranged inside a sealed chamber 17 connected to a vacuum pump 18 that maintains a vacuum of about $10^{-4}$-$10^{-6}$ mbar inside the chamber. Such a pressure level ensures that the electron gun can operate correctly and makes it possible to prevent oxidation effects when the selective fusion of the powder is carried out by the laser source. The vacuum pump 18 is chosen so that its pumping speed is high enough to take into account both degassing resulting from the thermal cycle, and the possible leak rate of the chamber 17.

The walls of the chamber 17 are preferably made of steel and are thick enough to protect the operator from X-rays, the walls possibly being about 20 to 30 mm in thickness. The chamber 17 moreover comprises portholes (not shown), allowing the operator to see various zones inside the apparatus while protecting him/her from the X-rays emitted by the electron gun and the light rays emitted by the laser source.

The control unit 9 controls the energy supply of the energy sources, the supply of powder from the hopper, the distribution, by the distributing means, of a powder layer, the movement of the platen, and also steers the energy sources. As a variant of the invention, the apparatus in addition comprises means for measuring temperature, such as an IR or CCD video camera, which means are able to communicate information relating to the temperature of the powder layer to the control unit, thus allowing the operating parameters of the electron gun and the laser source to be adjusted during phases of selective fusion of the powder layers.

According to an embodiment of the invention, the laser beam 19 originating from the source 12 is used to consolidate, layer by layer, the skin or external border 21 of the object 2, and the electron beam 20 originating from the gun 11 is used to consolidate, either layer by layer or a plurality of layers simultaneously, the central internal portion 22 or core of the object 2.

Figure 2:
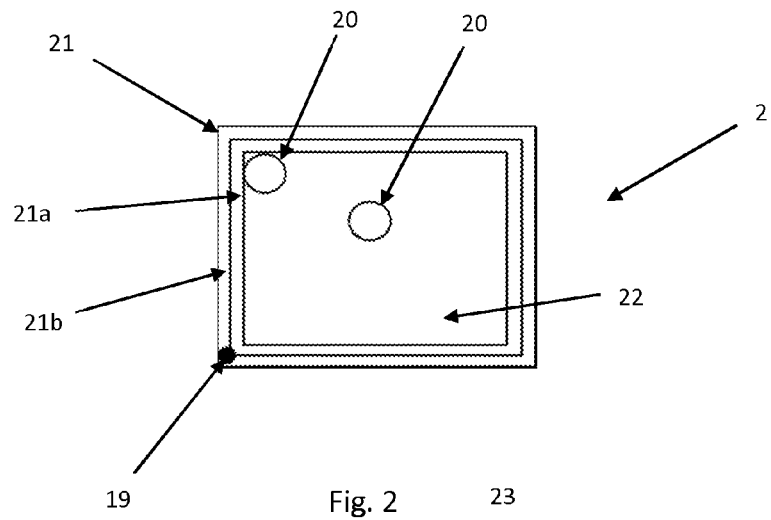
FIG. 2 is a top view of the object, schematically showing zones of impact of the two energy beams used in the apparatus of an embodiment of the invention.

As may be better seen in FIG. 2, the laser beam 19 produces the external border 21 of the object, layer by layer, by producing, in succession, a plurality of beads, namely here an internal bead 21*a* and an external bead 21*b*, starting from the interior and moving toward the exterior of the external border 21. The electron beam 20 is moved over the area of the powder layer, corresponding to the central internal portion 22, located inside the internal bead 21*a*, starting at the centre of the central internal part 22 and finishing near the internal bead 21*a*, its movement being such as to move it closer to the bead produced beforehand by the laser beam. The electron beam 20 fuses the core of the part layer by layer, or once N layers have been fused on the periphery by the laser beam 19.

Thus, the deposited powder layer is rapidly consolidated by virtue of the electron beam, which rapidly scans a large area, namely that of the central portion of the layer, the movement of the laser beam, although certainly slower, following, for its part, a shorter path, namely that of the contour of said central portion, and at the same time as the electron beam is moved. Moreover, it has been observed, in laboratory tests, that the metallurgical properties of the object are preserved at the interface connecting the skin and the core of the object thus obtained.

Figure 3A:
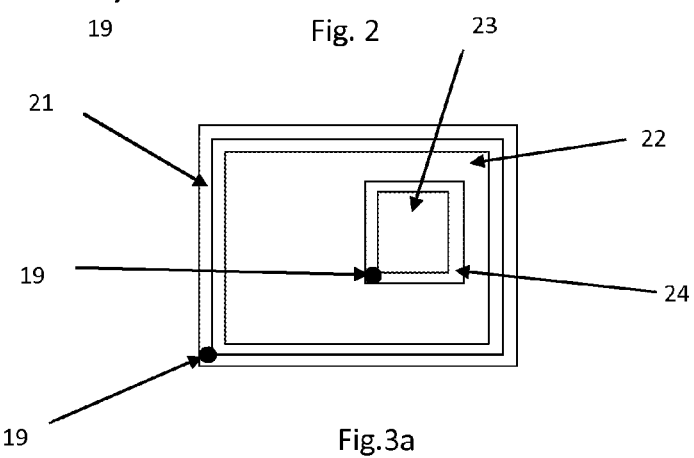
FIGS. 3a to 3c schematically illustrate top views of various objects produced with the apparatus and the process of embodiments of the invention.
Figures 3B, 3C:
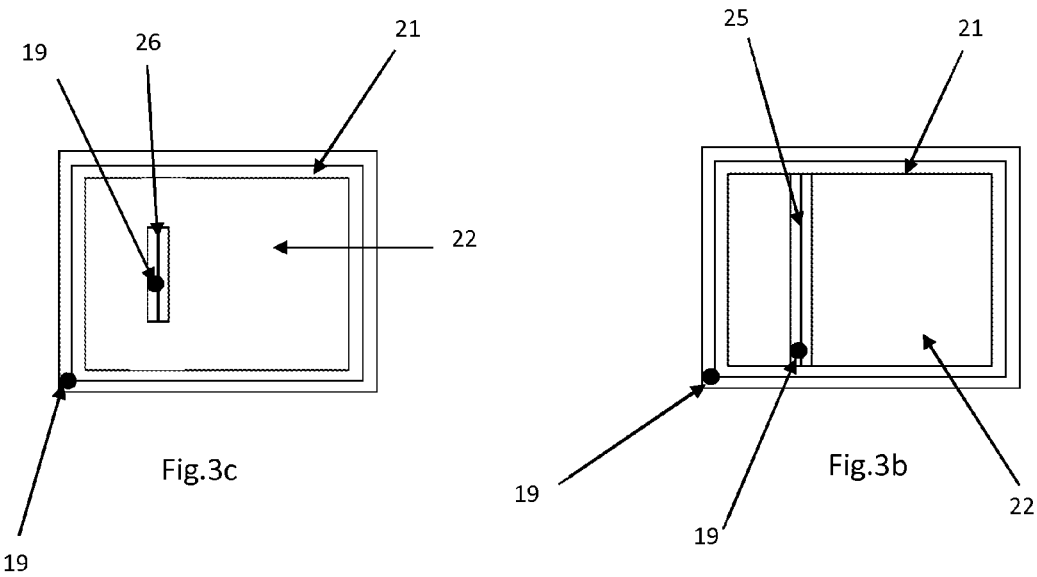

FIGS. 3*a* to 3*c* illustrate various geometries produced by consolidating powder layers with the apparatus and according to the process of an embodiment of the invention. Thus, FIG. 3*a* illustrates a similar view to that in FIG. 2, but in addition comprising an internal border 24 enclosing a restricted central internal portion 23. The internal border 24 is produced by moving the laser beam 19, and the restricted central internal zone 23 by moving the electron beam 20 inside the internal border 24. The internal border 24 may be produced by a laser beam originating from the same source used to produce the border 21, the border 24 being produced consecutively to the border 21, or it may be produced by a laser beam originating from a second laser source arranged in the same chamber as the first and, in this case, the borders 21 and 24 may be produced simultaneously. Likewise, the restricted central portion 23 is produced consecutively to the central internal portion 22 when one and the same electron beam is used, or, as a variant, the two central portions 22, 23 are consolidated simultaneously by two electron beams issued from different sources.

FIGS. 3*b* and 3*c* illustrate similar views to that in FIG. 2, but in which, using a laser beam 19, beads 25, 26 have been produced arranged in the central internal portion 22. Thus, FIG. 3*b* illustrates a long bead 25 connected to the external border 21, and FIG. 3*c* a short bead 26 isolated within the central internal portion 22. The beads are schematically represented by rectangular shapes in the figures, but of course it is possible for them to be produced with other desired geometric shapes using the laser beam 19 steered by the central unit 9. Likewise, as described above, the laser beam used to produce the beads 25, 26 may come from the same laser source as that used to produce the border 21, or from a different source.

Figure 4A:
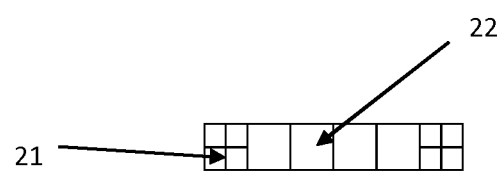
FIGS. 4a to 4c schematically illustrate cross-sectional views of various layers consolidated with the apparatus and process of the invention, according to variant embodiments of the invention.
Figure 4B:
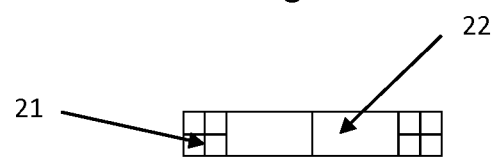
Figure 4C:
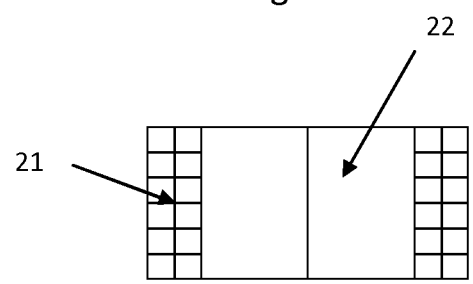

FIGS. 4a to 4c schematically show cross-sectional views of various layers consolidated with the apparatus and the process of the invention, according to various embodiments of the invention. Thus, FIG. 4a illustrates the consolidation of a powder layer the external border 21 of which is produced in a plurality of passes of the laser beam 19 and the central internal portion 22 of which is produced in a plurality of passes of the electron beam 20. FIG. 4b is a similar view to that in FIG. 4a, but in which the central internal portion is consolidated with a smaller number of electron-beam passes than in the preceding case. FIG. 4c illustrates a variant in which the external border is produced by successive consolidation of a plurality of powder layers (three layers in the example shown) and in which the central internal portion 22 is consolidated by the electron beam after all the (three) deposited layers of the external border 21 have been consolidated by the laser beam.

By way of example, the diameter of the laser beam used is comprised between 5 µm and 100 µm and the diameter of the electron beam used is comprised between 20 µm and 500 µm.

The powders used with the process of the invention are metal powders, such as powders of Ti, Ni/Ti, superalloys, aluminum alloys, invar, stainless steels, CoCr, maraging or other metals, or ceramic powders. Depending on the geometry and the mechanical or surface properties of the object to be produced, and depending on the thickness of the targeted final layer, the average diameter of the particles of the powder may vary from a few microns, for example 5 µm, to 300 µm. Depending on the operating parameters of the energy beams used, and depending on the powders used, the thickness of a powder layer may vary from a few microns, for example 10 µm, to several hundred microns, for example 500 µm.

The control unit 9 is able to control separately the actuation of the laser beam 19 and of the electron beam 20 depending on the geometry of the object to be produced. Thus it will be understood that, for certain sections, the control unit 9 is able to control only the laser beam 19, in order to create an external border around a hollow central internal portion, the electron beam 20 for its part being put on standby.

Other variants and embodiments of the invention may be envisioned without departing from the scope of its claims. Thus, a plurality of election-beam sources and/or a plurality of laser-beam sources may be used to fuse a powder layer according to the process and with the apparatus of the invention.

The invention claimed is:

1. A process for manufacturing a three-dimensional object by successive layer-by-layer consolidation of selected zones of a powder stratum, the consolidated zones corresponding to successive sections of the three-dimensional object, each layer being divided into a central internal portion and an external border, comprising, in order:
   a—depositing a powder layer on a holder;
   b—fusing the external border of said powder layer by means of a laser beam originating from a first energy source by moving the laser beam of said first energy source relative to the object along a preset path that follows the contour of said external border corresponding to the contour of the cross section of the object so as to selectively fuse said layer; and
   c—fusing the central internal portion of the powder layer by means of an electron beam originating from a second energy source, by moving the electron beam of said second energy source relative to the object so as to sweep it over said central internal portion along a preset path corresponding to the central internal portion of the cross section of the object so as to selectively fuse said layer; or
   d—repeating steps a and b N times so as to form a plurality of superposed layers of fused material forming a portion of the external border of said object and then carrying out step c so as to fuse the central internal portion of the object corresponding to the N powder layers; and
   e—repeating steps a to c or a, b and d until all the layers of the object have been consolidated.

2. The process according to claim 1, wherein, for a given section, the width of said external border is at most 1 mm.

3. The process according to claim 1, wherein the fusion by the laser beam starts in a zone distant from the center of the object, and the fusion by the electron beam starts in a zone near the center of the object.

4. The process according to claim 1, further comprising an additional step of fusion by the laser beam of an internal border or of a bead arranged in the central internal portion.

5. The process according to claim 1, wherein a ratio between energy delivered by the electron beam and energy delivered by the laser beam is between 4:1 and 9:1.

6. The process according to claim 1, wherein the powder is composed of particles that have an average diameter between 5 µm and 300 µm.

7. The process according to claim 1, wherein said central internal portion has an open structure.

8. The process according to claim 1, further comprising at least one additional step of preheating the powder layer using at least one of said first or second energy sources.

9. The process according to claim 1, further comprising an additional step of finishing the central internal portion and the external border of the object by fusing the last powder layer using the laser beam.

10. The process according to claim 1, wherein the specific power of the electron beam is between $2 \times 10^6$ and $50 \times 10^6$ W/cm$^2$.

11. The process according to claim 1, wherein the specific power of the laser beam is between 200 and 2400 kW/cm$^2$.

12. The process according to claim 1, wherein said powder is a metal powder.

13. The process according to claim 1, wherein a focal point of the electron beam is located above a surface of said powder layer.

14. The process according to claim 1, wherein the powder layer and the first and second energy sources are in a vacuum.

15. The process according to claim 14, wherein the vacuum has a pressure in the range of $10^{-4}$ to $10^{-6}$ mbar.

16. The process according to claim 1, wherein the second energy source is held stationary and wherein the electron beam is moved relative to the object by deflecting the electron beam with deflecting coils.

* * * * *